(12) United States Patent
Terry et al.

(10) Patent No.: US 8,341,482 B2
(45) Date of Patent: *Dec. 25, 2012

(54) USER EQUIPMENT USING HYBRID AUTOMATIC REPEAT REQUEST

(75) Inventors: Stephen E. Terry, Northport, NY (US); Ariela Zeira, Huntington, NY (US); Nader Bolourchi, Larchmont, NY (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/311,148

(22) Filed: Dec. 5, 2011

(65) Prior Publication Data

US 2012/0079337 A1    Mar. 29, 2012

Related U.S. Application Data

(63) Continuation of application No. 11/975,749, filed on Oct. 22, 2007, now Pat. No. 8,074,140, which is a continuation of application No. 10/279,393, filed on Oct. 24, 2002, now Pat. No. 7,287,206.

(60) Provisional application No. 60/357,224, filed on Feb. 13, 2002.

(51) Int. Cl.
   *G01R 31/30* (2006.01)
   *H04L 1/18* (2006.01)
   *H04J 3/22* (2006.01)

(52) U.S. Cl. ......................... 714/748; 370/470

(58) Field of Classification Search .................. 714/748, 714/749, 807, 808; 370/345, 470–474
   See application file for complete search history.

(56) References Cited

U.S. PATENT DOCUMENTS

6,208,663 B1   3/2001   Schramm et al.
6,212,240 B1   4/2001   Scheibel et al.
(Continued)

FOREIGN PATENT DOCUMENTS

CN   1332540   1/2002
(Continued)

OTHER PUBLICATIONS

3GPP, "3rd Generation Partnership Project; Technical Specification Group Radio Access Network; Physical layer procedures (FDD) (Release 5)," 3GPP TS 25.214 V5.2.0 (Sep. 2002).

(Continued)

*Primary Examiner* — Cynthia Britt
(74) *Attorney, Agent, or Firm* — Blakely, Sokoloff, Taylor & Zafman LLP

(57) ABSTRACT

A user equipment comprises a transmitter and an adaptive modulation and coding controller. The transmitter is configured to transmit data over an air interface in a single transmission time interval with a first specified modulation and coding scheme, where the single transmission time interval has a plurality of transport block sets. In response to receiving a repeat request for retransmission of at least one particular transport block set, the transmitter retransmits the at least one of the particular transport block sets. The adaptive modulation and coding controller is configured to change the specified modulation and coding scheme to a second specified modulation and coding scheme, enabling a combining of a particular transport block set transmitted at the first specified modulation and coding scheme with a retransmitted version of the particular transport block set transmitted at the second specified modulation and coding scheme.

29 Claims, 7 Drawing Sheets

U.S. PATENT DOCUMENTS

| | | | |
|---|---|---|---|
| 6,307,867 B1 | 10/2001 | Roobol et al. | |
| 6,308,294 B1 | 10/2001 | Ghosh et al. | |
| 6,314,541 B1 | 11/2001 | Seytter et al. | |
| 6,594,791 B2 | 7/2003 | Sipola | |
| 6,697,347 B2 | 2/2004 | Ostman et al. | |
| 6,704,898 B1 | 3/2004 | Furuksar et al. | |
| 6,842,445 B2 | 1/2005 | Ahmavaara et al. | |
| 6,999,432 B2 * | 2/2006 | Zhang et al. | 370/328 |
| 7,178,089 B1 | 2/2007 | Frenger et al. | |
| 7,287,206 B2 | 10/2007 | Terry et al. | |
| 2001/0020285 A1 | 9/2001 | Fujiwara et al. | |
| 2001/0056560 A1 | 12/2001 | Khan et al. | |
| 2002/0071407 A1 | 6/2002 | Koo et al. | |
| 2003/0039226 A1 | 2/2003 | Kwak | |

FOREIGN PATENT DOCUMENTS

| | | |
|---|---|---|
| CN | 2662570 | 12/2004 |
| JP | 05-091091 | 4/1993 |
| JP | 08-084162 | 3/1996 |
| JP | 10-247955 | 9/1998 |
| JP | H11-331296 | 11/1999 |
| JP | 2000-188609 | 7/2000 |
| JP | 1332540 | 1/2002 |
| WO | 99/12303 | 3/1999 |
| WO | 00/05911 | 2/2000 |
| WO | 00/49760 | 8/2000 |

OTHER PUBLICATIONS

3GPP, "3rd Generation Partnership Project; Technical Specification Group Radio Access Network; High Speed Downlink Packet Access (HSDPA); Overall desciption; Stage 2 (Release 5)," 3GPP TS 25.308 V5.2.0 (Mar. 2003).

Nortel Networks, "Discussion on ARQ aspects for High Speed Downlink Packet Access," TSG-RAN Working Group1 meeting #17, TSGR1#17(00)1442 (Nov. 21-24, 2000).

3GPP, "3rd Generation Partnership Project; Specification Group Radio Access Network; Multiplexing and channel coding (FDD) (Release 5)," 3GPP TS 25.212 V5.2.0 (Sep. 2002).

3GPP, "3rd Generation Partnership Project; Technical Specification Group Radio Access Network; Multiplexing and channel coding (FDD) (Release 1999)," 3GPP TS 25.212 V3.11.0 (Sep. 2002).

3GPP, "3rd Generation Partnership Project; Technical Specification Group Radio Access Network; Multiplexing and channel coding (FDD) (Release 4)," 3GPP TS 25.212 V4.6.0 (Sep. 2002).

3GPP, "3rd Generation Partnership Project; Technical Specification Group Radio Access Network; High Speed Downlink Packet Access (HSDPA); Overall description; Stage 2 (Release 5)," 3GPP TS 25.308 V5.2.0 (Mar. 2003).

3GPP, "3rd Generation Partnership Project; Technical Specification Group Radio Access Network; High Speed Downlink Packet Access (HSDPA); Overall description; Stage 2 (Release 5)," 3GPP TS 25.308 v5.1.0 (Dec. 2001).

3GPP, "3rd Generation Partnership Project; Technical Specification Group Radio Access Network; Multiplexing and channel coding (FDD) (Release 1999)," 3GPP TS 25.212 V3.8.0 (Dec. 2001).

3GPP, "3rd Generation Partnership Project; Technical Specification Group Radio Access Network; Physical layer procedures (FDD) (Release 1999)," 3GPP TS 25.214 V3.9.0 (Dec. 2001).

3GPP, "3rd Generation Partnership Project; Technical Specification Group Radio Access Network; Physical layer procedures (FDD) (Release 1999)," 3GPP TS 25.214 V3.11.0 (Sep. 2002).

3GPP, "3rd Generation Partnership Project; Technical Specification Group Radio Access Network; Physical layer procedures (FDD) (Release 4)," 3GPP TS 25.214 V4.3.0 (Dec. 2001).

3GPP, "3rd Generation Partnership Project; Technical Specification Group Radio Access Network; Physical layer procedures (FDD) (Release 4)," 3GPP TS 25.214 V4.5.0 (Sep. 2002).

3GPP, "3rd Generation Partnership Project; Technical Specification Group Radio Access Network; Physical layer procedures (FDD) (Release 5),"3GPP TS 25.214 v5.2.0 (Sep. 2002).

Atarashi et al., "Partial Frequency ARQ for Multi-Carrier Modulation," Technical Report of the IEICE, vol. 94, No. 108, pp. 67-72 (1994).†.

Brito et al., "An Analytical Comparison Among Adaptive Modulation, Adaptive FEC, Adaptive ARQ and Hybrid Systems for Wireless ATM Networks," The 5$^{th}$ International Symposium on Wireless Personal Multimedia Communications, vol. 30, pp. 1034-1038 (Oct. 2002).

Castro, "The UMTS Network and Radio Access Technology," John Wiley and Sons, Ltd., p. 150-151, 164, and 175 (2001).

Eriksson et al., "Comparison of Link Quality Control Strategies for Packet Data Services in EDGE", Vehicular Technology Conference, IEEE, vol. 2, 1999, pp. 938-942.

ETSI, "Universal Mobile Telecommunications System (UMTS); Multiplexing and channel coding (FDD) (3GPP TS 25.212 version 4.3.0 Release 4)," ETSI TS 125 212 V4.3.0 (Dec. 2001).

Molkdar et al., "An Overview of EGPRS: The Packet Data Component of EDGE", Electronics and Communication Engineering Journal, Institution of Electrical Engineers, London, GB, vol. 14, No. 1, Feb. 2002, pp. 21-38.

Naijoh et al., "ARQ Schemes with Adaptive Modulation/TDMA/TDD Systems for Wireless Multimedia Communication Services," The 8$^{th}$ IEEE International Symposium on Personal, Indoor and Mobile Radio Communications, vol. 2, pp. 709-713 (Sep. 1997).

NORTEL NETWORKS et al., "Stand-alone DSCH, proposed text for inclusion in TR 25.848 V0.4.0," TSG-RAN Working Group 1 Meeting#19, TSG1#19(01)0293 (Feb. 27-Mar. 3, 2001).

NORTEL NETWORKS, "Discussion on ARQ aspects for High Speed Downlink Packet Access," TSG-RAN Working Group1 meeting#17, TSGR1#17(00)1442 (Nov. 21-24, 2000).

Parkvall et al., "The high speed packet data evolution of WCDMA," IEEE International Symposium on Personal Indoor and Mobile Radio Communications, vol. 2, pp. 27-31 (Sep. 2001).

Sawahashi et al., "Improvements in W-CDMA: Principles and Experimental Results," Annals of Telecommunications, vol. 56, No. 5/06 (May 2001).

* cited by examiner

USER EQUIPMENT USING HYBRID AUTOMATIC REPEAT REQUEST

CROSS REFERENCE TO RELATED APPLICATIONS

This application is a continuation of U.S. patent application Ser. No. 11/975,749, filed Oct. 22, 2007, which issued on Dec. 6, 2011 as U.S. Pat. No. 8,074,140, which is a continuation of U.S. patent application Ser. No. 10/279,393, filed Oct. 24, 2002, which issued on Oct. 23, 2007 as U.S. Pat. No. 7,287,206, which claims priority to U.S. Provisional Application No. 60/357,224, filed Feb. 13, 2002, the contents of which are hereby incorporated by reference herein.

BACKGROUND

This invention generally relates to wireless communication systems. In particular, the invention relates to transmission of data in such systems where adaptive modulation & coding (AMC) and hybrid automatic repeat request (H-ARQ) techniques are applied.

In wireless communication systems, such as the third generation partnership project (3GPP) time division duplex (TDD) or frequency division duplex (FDD) communication systems using code division multiple access (CDMA) or orthogonal frequency division multiplex (OFDM) systems, AMC is used to optimize the use of air resources.

The modulation and coding schemes (sets) used to transmit data are varied based on wireless channel conditions. To illustrate, a type of error encoding (such as turbo versus convolutional coding), coding rate, spreading factor for CDMA system, modulation type (such as quadrature phase shift keying versus M-ary quadrature amplitude modulation), and/or adding/subtracting sub-carriers for an OFDM system may change. If channel characteristics improve, a lower data redundancy and/or "less robust" modulation and coding set is used to transfer data. As a result, for a given allocation of radio resources, more user data is transferred resulting in a higher effective data rate. Conversely, if channel characteristics degrade, a higher data redundancy "more robust" modulation and coding set is used, transferring less user data. Using AMC, an optimization between air resource utilization and quality of service (QOS) can be better maintained.

Data in such systems is received for transfer over the air interface in transmission time intervals (TTIs). Data within a TTI transferred to a particular user equipment is referred to as a transport block set (TBS). For a particular allocation of air resources, a less robust modulation and coding set allows for larger TBS sizes and a more robust modulation and coding set only allows for smaller TBS sizes. As a result, the modulation and coding set for a given radio resource allocation dictates the maximum size of the TBS that can be supported in a given TTI.

In such systems, a hybrid automatic repeat request (H-ARQ) mechanism may be used to maintain QOS and improve radio resource efficiency. A system using H-ARQ is shown in FIG. 1. A transmitter 20 transmits a TBS over the air interface using a particular modulation and coding set. The TBS is received by a receiver 26. An H-ARQ decoder 30 decodes the received TBS. If the quality of the received data is unacceptable, an ARQ transmitter 28 requests a retransmission of the TBS. One approach to check the quality of the received TBS is a cyclic redundancy check (CRC). An ARQ receiver 22 receives the request and a retransmission of the TBS is made by the transmitter 20. Retransmissions may apply a more robust modulation and coding set to increase the possibility of successful delivery. The H-ARQ decoder 30 combines, the received TBS versions. A requirement for combining is that combined TBSs are identical. If the resulting quality is still insufficient, another retransmission is requested. If the resulting quality is sufficient, such as the combined TBS passes the CRC check, the received TBS is released for further processing. The H-ARQ mechanism allows for data received with unacceptable quality to be retransmitted to maintain the desired QOS.

In a system using both H-ARQ and AMC, a change in modulation and coding set may be determined necessary to achieve successful delivery of a requested TBS retransmission. In this situation, the maximum amount of physical data bits allowed within the TTI varies with the modulation and coding set.

Since only one TBS exists per TTI the effective user data rate corresponds to the TBS size applied to each TTI. To achieve maximum data rates the largest TBS size is applied to the least robust modulation and coding set within the TTI. When wireless channel conditions require a more robust modulation and coding set for successful transmission, such as when a TBS size can not be supported within the TTI. Therefore, when operating at the maximum data rate, each time a more robust modulation and coding requirement is realized, all outstanding transmissions in H-ARQ processes that have not been successfully acknowledged must be discarded.

When Incremental Redundancy (IR) is applied, TBS data must remain constant in retransmissions for proper combining. Therefore, to guarantee that a TBS retransmission can be supported at a more robust modulation and coding set then the initial transmission, the TBS size used must correspond to the most robust MCS. However, when a TBS size allowed by the most robust modulation and coding set is applied the maximum data rate to the mobile is reduced, and when a less robust modulation and coding set is applied physical resources are not fully utilized.

When the TBS size is not supported by the more robust modulation and coding set, the TBS can be retransmitted using the old modulation and coding set. However, if the channel conditions dictate that a more robust modulation and coding set be used or the initial transmission was severally corrupted, the combining of the retransmitted TBSs may never pass, resulting in a transmission failure.

In current implementations, when a TBS can not be successfully transmitted by AMC & H-ARQ mechanisms, recovery is handled by the radio link control (RLC) protocol (at layer two). Unlike a H-ARQ recovery of failed transmissions, the RLC error detection, data recovery and buffering of a TBS queued in the node-B, results in increased block error rates and data latency, potentially resulting in a failure to meet QOS requirements.

Accordingly, to provide maximum data rates with minimal H-ARQ transmission failures, it is desirable to support incremental redundancy and allow adaptation of modulation and coding sets in such systems.

SUMMARY

A user equipment comprises a transmitter and an adaptive modulation and coding controller. The transmitter is configured to transmit data over an air interface in a single transmission time interval with a first specified modulation and coding scheme, where the single transmission time interval has a plurality of transport block sets. In response to receiving a repeat request for retransmission of at least one particular transport block set, the transmitter retransmits the at least one of the particular transport block sets. The adaptive modulation and coding controller is configured to change the specified modulation and coding scheme to a second specified modulation and coding scheme, enabling a combining of a particular transport block set transmitted at the first specified modulation and coding scheme with a retransmitted version of the particular transport block set transmitted at the second specified modulation and coding scheme.

DETAILED DESCRIPTION OF THE PREFERRED EMBODIMENTS

Figure 1:
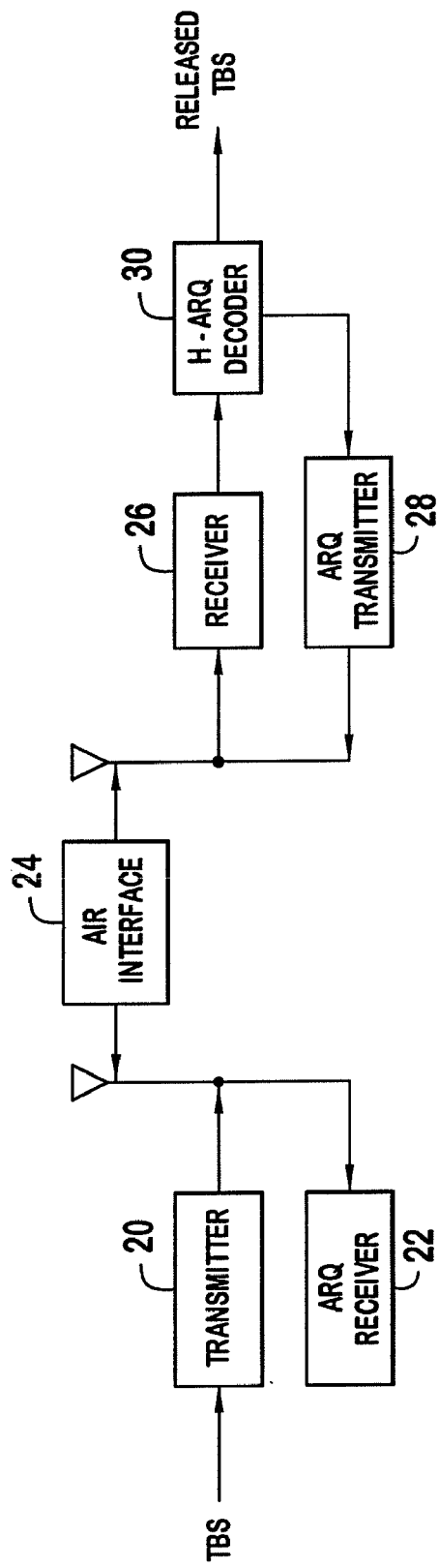
FIG. 1 is an embodiment of a wireless H-ARQ communication system.
Figure 2A:
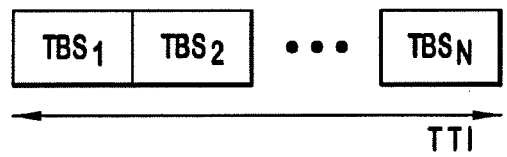
FIGS. 2A-2D are illustrations of a TTI having multiple TBSs.
Figure 2B:
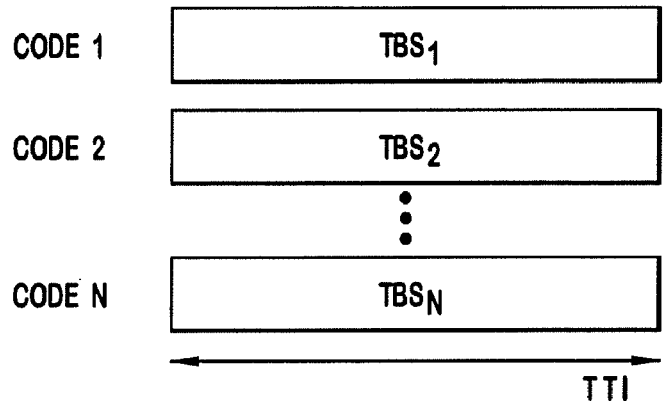
Figure 2C:
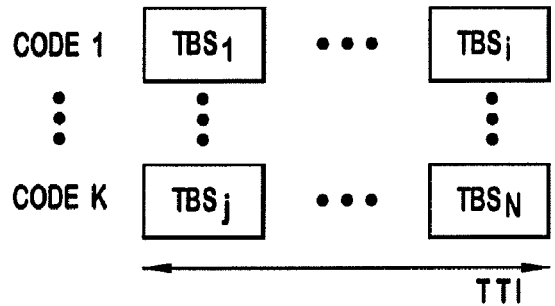
Figure 2D:
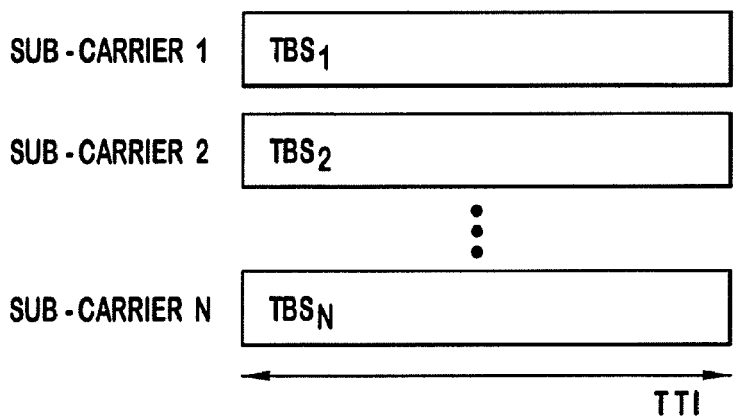

FIGS. 2A, 2B, 2C and 2D illustrate a TTI having multiple TBSs, $TBS_1$ to $TBS_N$. FIG. 2A illustrates multiple TBSs dividing a TTI by time, such as for use in a TDD/CDMA system. FIG. 2B illustrates multiple TBSs divided by codes, such as for use in a FDD/CDMA or TDD/CDMA system. FIG. 2C illustrates dividing multiple TBSs by time and codes, such as for use in TDD/CDMA system. FIG. 2D illustrates dividing multiple TBSs by sub-carriers, such as for use in an OFDM system. Each TBS is sized to allow transmission with the most robust modulation coding set for the allocated resources. To illustrate, the most robust MCS may only have the capacity to support a maximum 2,000 bit TBS within the TTI. Although referred to as the most robust modulation coding set, in practice, the most robust set may actually be a more robust set, if the most robust modulation coding set is unlikely to be needed. The least robust modulation and coding set may have the capacity to support a maximum of 20,000 bit TBS within the TTI. Although referred to as the least robust modulation coding set, in practice, the least robust set may actually be a less robust set, if the least robust modulation coding set is unlikely to be needed.

The TBS is sized, preferably, to allow for transmission with the most robust modulation and coding set within a TTI. Then when the least robust modulation and coding set is applied, multiple TBSs of this size are applied within the TTI to achieve maximum data rates, and when greater transmission reliability is required for successful delivery the most robust modulation and coding set can be applied.

Figure 3A:
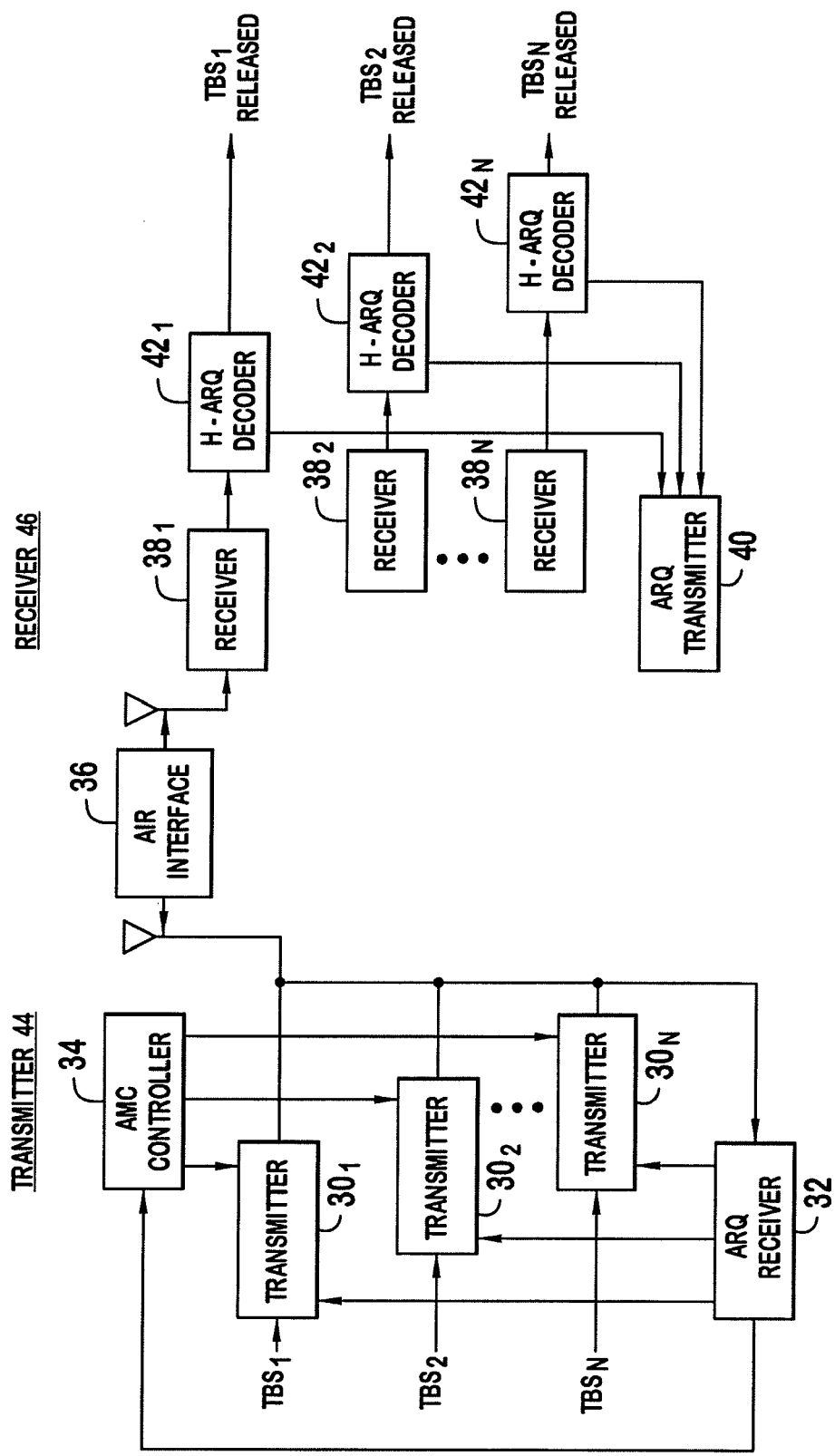
FIGS. 3A-3C are embodiments of a wireless H-ARQ communication system using AMC with TTIs capable of having multiple TBSs.

FIG. 3A is a simplified diagram of a transmitter 44 and receiver 46 for transmitting a TTI having one or multiple TBSs. The transmitter 44 may be located at either a user equipment or a base station/Node-B. The receiver 46 may be located at either a base station/Node-B or a user equipment. In current system implementations, AMC is typically only used in the downlink. Accordingly, the preferred implementation of transmission is for use in supporting AMC for the downlink. For other systems using AMC in the uplink, transport block set transmission can be applied to the uplink.

Figure 3B:
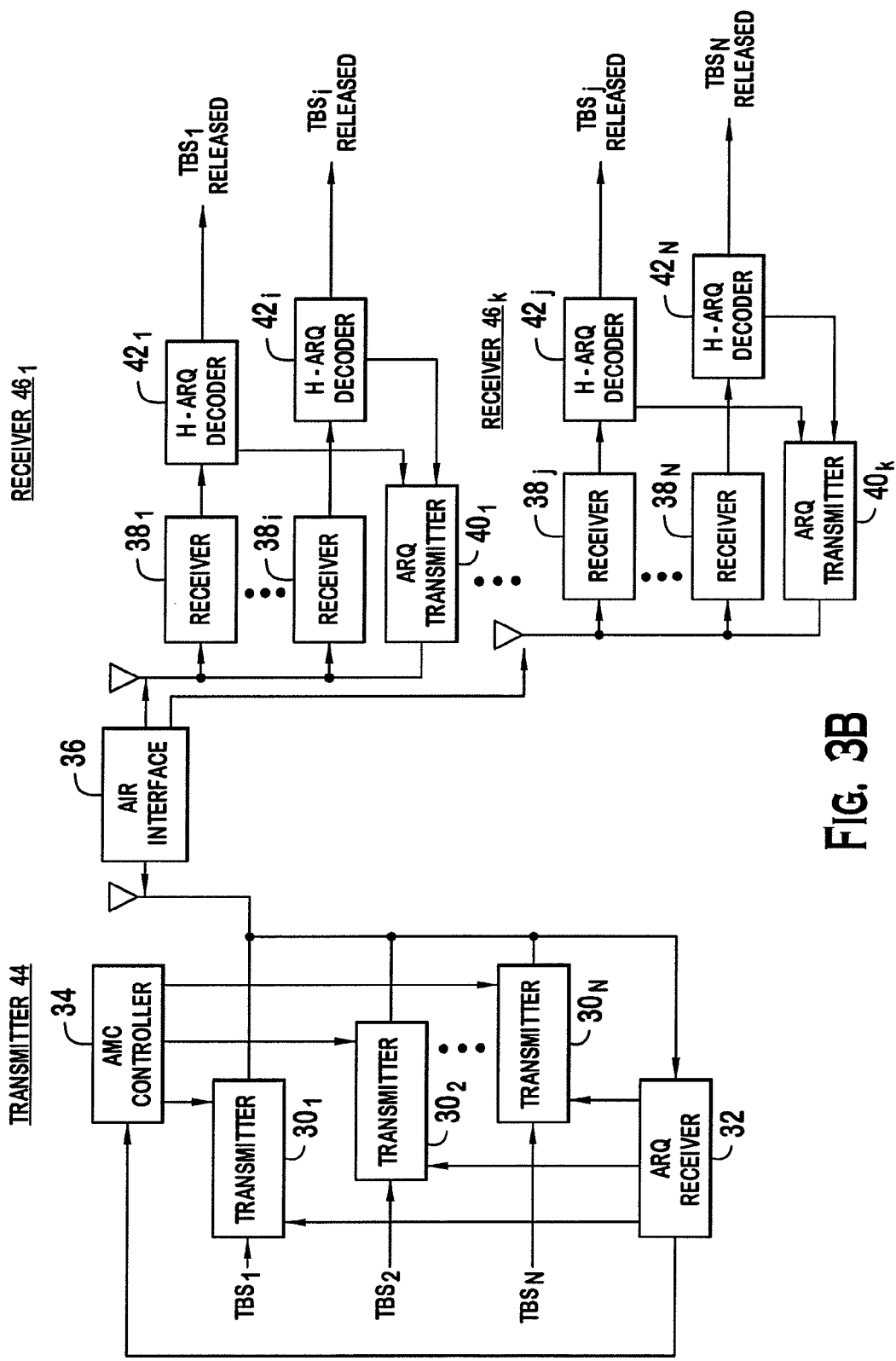
Figure 3C:
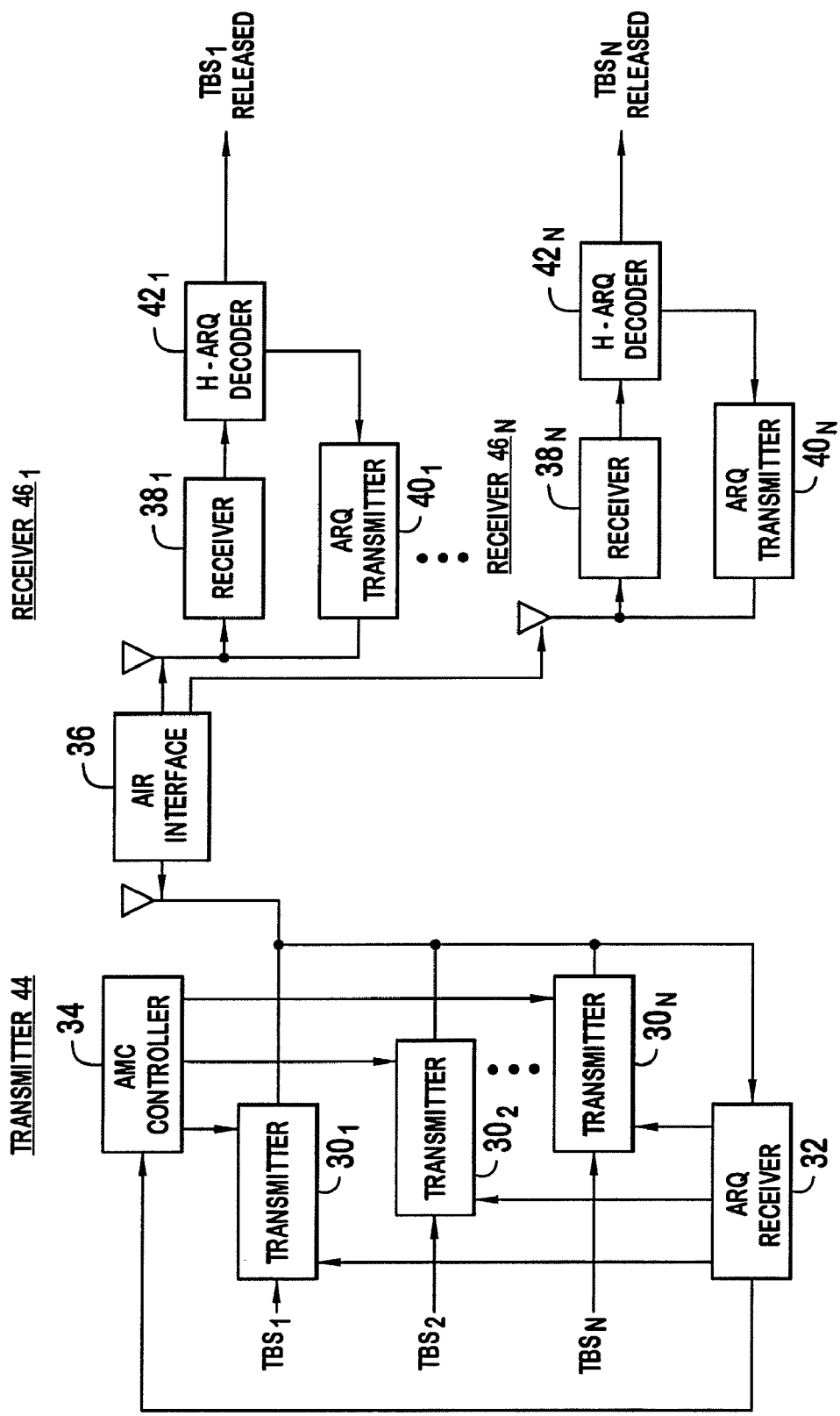

A transmitter $30_1$ to $30_N$ (30) transmits each TBS, $TBS_1$ to $TBS_N$, over the air interface 36. The number of TBSs in the TTI depends on the TBS size and the modulation and coding set used for transmission. If the most robust modulation and coding set is used to ensure successful delivery, the TTI may only support one TBS. If a lesser robust modulation and coding set is used to achieve higher effective data rates, multiple TBSs are sent in the TTI. Alternately, some TBSs may be destined for a different receiver $46_1$ to $46_K$ (46), as shown in FIG. 3B. Each TBS may also be sent to a different receiver $46_1$ to $46_N$ (46), as shown in FIG. 3C. This flexibility allows for greater radio resource utilization and efficiency.

A receiver $38_1$ to $38_N$ (38) receives each transmitted TBS. A H-ARQ decoder $42_1$ to $42_N$ (42) decodes each received TBS. Although in FIG. 3 one transmitter 30, receiver 38 and H-ARQ decoder 42 is shown for each TBS, one transmitter 30, receiver 38 and H-ARQ decoder 42 may handle all the TBSs. For each TBS failing the quality test, a request for retransmission is made by the ARQ transmitter 40. An ARQ receiver 32 receives the request and directs the appropriate TBS(s) to be retransmitted. The retransmitted TBS(s) are combined by the H-ARQ decoder(s) 42 and another quality test is performed. Once the TBS(s) passes the quality test, it is released for further processing. Since a TTI can contain multiple TBSs, preferably, a failure in one TBS does not necessarily require retransmission of the entire TTI, which more efficiently utilizes the radio resources.

Figure 4:
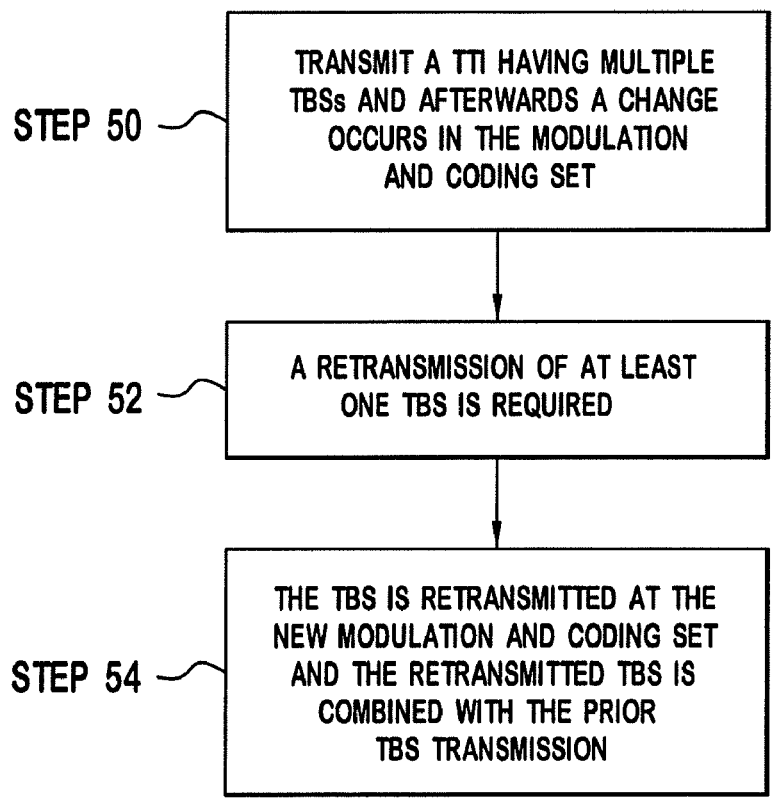
FIG. 4 is a flow chart of changing the modulation and coding set prior to a H-ARQ retransmission.
Figure 5:
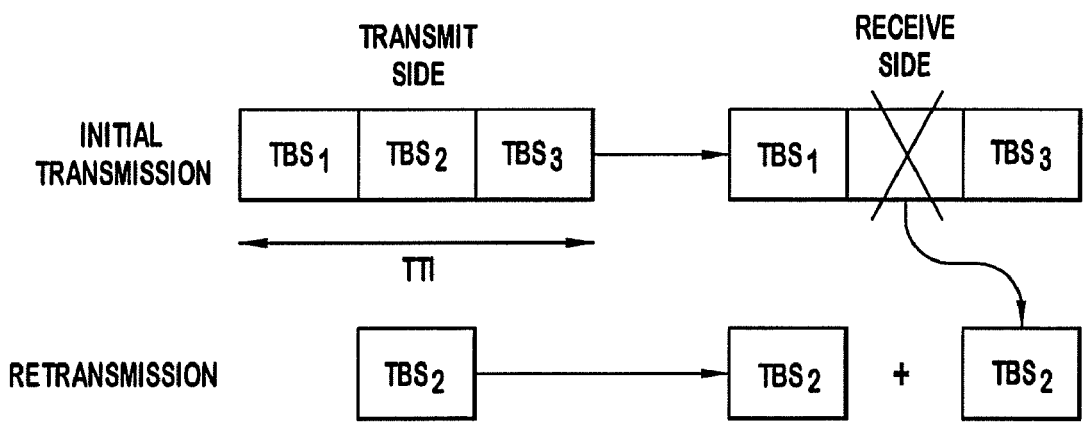
FIG. 5 is an illustration of changing the modulation and coding set prior to a retransmission of a single TBS.

An AMC controller 34 is also shown in FIGS. 3A, 3B and 3C. If the channel conditions change, the AMC controller may initiate a change in the modulation and code set used to transfer data. FIG. 4 is a flow diagram illustrating such a change occurring in AMC between retransmissions. A TTI is transmitted having multiple TBSs and afterwards, a change in the modulation and coding set occurs, (step 50). To illustrate using FIG. 5, a TTI has three TBSs, $TBS_1$, $TBS_2$ and $TBS_3$ applied at the least robust modulation and coding set to achieve the maximum data rate. The modulation and coding set in FIG. 5 changes so that only one TBS can be transmitted subsequently. Referring back to FIG. 4, at least one of the TBSs is received with an unacceptable quality and a retransmission is required, (step 52). In the illustration of FIG. 5, $TBS_2$ requires retransmission, as shown by a large "X". The TBS requiring retransmission is sent at the new modulation and coding set and combined with the prior TBS transmission, (step 54). As shown in FIG. 5, only $TBS_2$ is retransmitted and it is combined with the prior $TBS_2$ transmission. Although this example illustrates sending only one TBS at the more robust modulation and coding set, it is also possible that two TBSs could be transmitted with the more robust modulation and coding set within the TTI.

Figure 6:
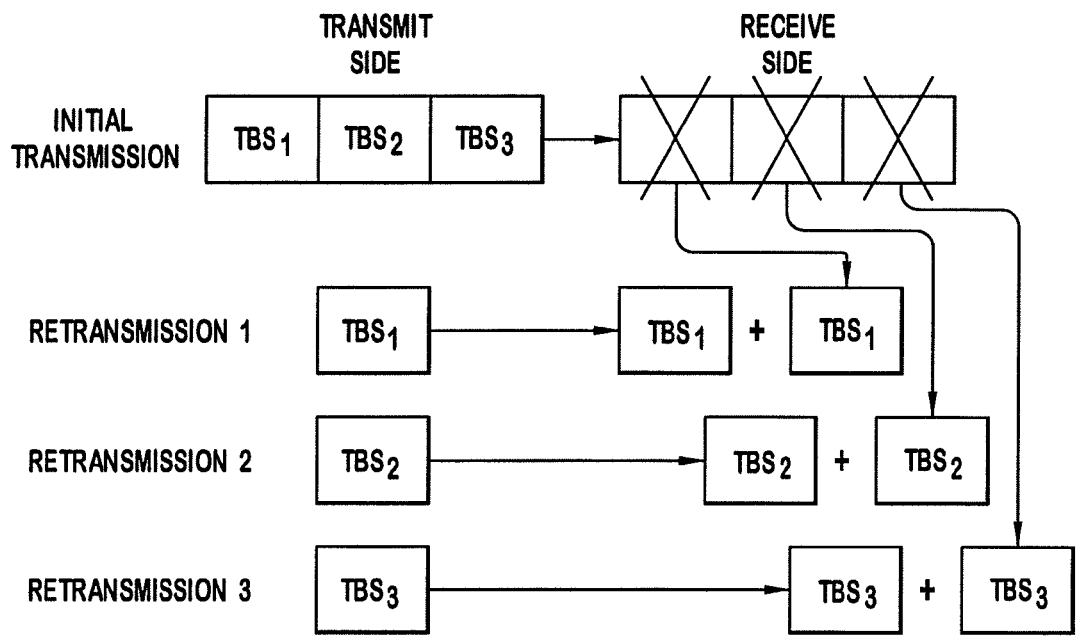
FIG. 6 is an illustration of changing the modulation and coding set prior to a retransmission of all three TBSs.

FIG. 6 is an illustration of multiple TBSs requiring retransmission. Three TBSs, $TBS_1$, $TBS_2$ and $TBS_3$, are transmitted in a TTI. A change in the modulation and coding set occurs such that only one TBS can be sent at a time. All three TBSs are received with an unacceptable quality. A request for retransmission is sent for all three TBSs. Sequentially, each TBS is retransmitted, as shown by retransmission 1, retransmission 2 and retransmission 3 in separate TTIs. The retransmitted TBSs are combined with the prior transmissions. A similar procedure is used, if two TBSs are transmitted with the more robust modulation and coding set within the TTI.

As illustrated, multiple TBSs allow for maximum data rates and incremental redundancy. A TTI can be transmitted at the least robust modulation and coding set achieving the maximum data rate and subsequent H-ARQ retransmission can be made at a more robust modulation and coding set ensuring greater probability for successful transmission. By allowing incremental redundancy, radio resources can be used more aggressively. A more aggressive (less robust) modulation and coding set can be used to achieve higher data rates and radio resource efficiency, since transmission can be made using a more conservative (more robust) set to maintain QOS, if channel conditions degrade.

Figures 7, 8:
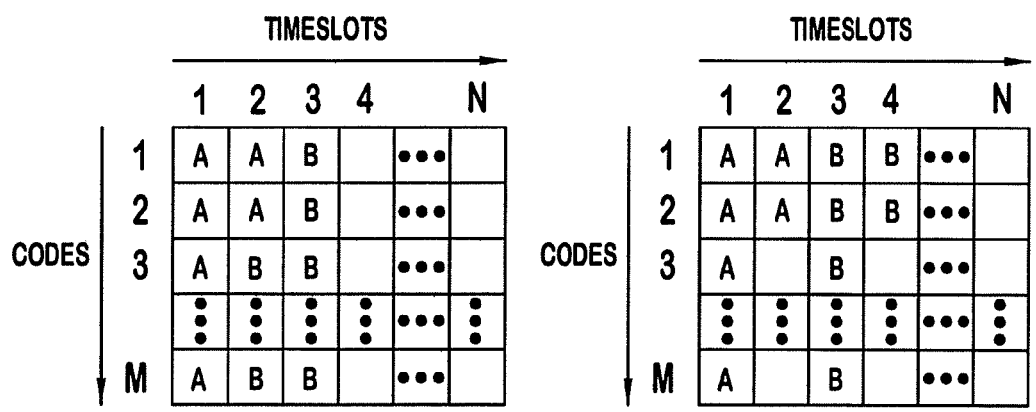
FIG. 7 is an illustration of overlapping TBSs in a TDD/CDMA communication system.
FIG. 8 is an illustration of non-overlapping TBSs in a TDD/CDMA communication system.

In a TDD/CDMA communication system, such as in the 3GPP system, two preferred approaches for implementing multiple TBSs within a TTI use either overlapping or non-overlapping time slots. In overlapping time slots, the TBSs may overlap in time. As illustrated in FIG. 7, a first TBS in a TTI uses the resource units having an "A" in them. A resource unit is the use of one code in a time slot. A second TBS has the "B" resource units. As shown in FIG. 7, in the second time slot, both the first and second TBS are transmitted. Accordingly, the two TBSs' transmissions overlap in time.

In non-overlapping TBSs, each time slot only contains one TBS of a TTI. As illustrated in FIG. 8, a first TBS ("A") is the only TBS in slots one and two. The second TBS ("B") is the only TBS in slots three and four.

In a FDD/CDMA communication system, such as in the third generation partnership project proposed system, transmissions occur simultaneously. In a FDD/CDMA system, preferably each TBS is assigned a different code/frequency pair for transmission. In an OFDM system, preferably each TBS is assigned a separate sub-carrier for transmission.

What is claimed is:

1. A method for receiving wireless communications, the method comprising:
   receiving a plurality of transport blocks (TBs) in a first transmission time interval (TTI) on a first plurality of sub-carriers;
   transmitting a negative acknowledgment (NACK) that indicates that one of a plurality of TBs requires retransmission;
   receiving on a second plurality of sub-carriers, a retransmitted one of the plurality of TBs in a second TTI in response to the receiving of the NACK, wherein the second plurality of sub-carriers are different than the first plurality of sub-carriers.

2. The method of claim 1, further comprising:
   transmitting an acknowledgment that indicates that one of the plurality of TBs does not require a retransmission.

3. The method of claim 1, wherein the indication that one of the plurality of TBs requires retransmission is based upon a cyclic redundancy check (CRC).

4. The method of claim 1, wherein each of the plurality of TBs has a different modulation and coding scheme (MCS).

5. The method of claim 1, wherein each TB of the plurality of TBs has a modulation and coding scheme (MCS) that is one of M-ary quadrature amplitude modulation (QAM) or quadrature phase shift keying (QPSK).

6. The method of claim 1, wherein the retransmitted one of the plurality of TBs has a modulation and coding scheme (MCS) that is different than the MCS of the one of the plurality of TBs.

7. The method of claim 1, wherein each TB of the plurality of TBs are transmitted on different subcarriers.

8. A user equipment (UE) configured to receive wireless communications, the UE comprising:
   at least one receiver configured to receive a plurality of transport blocks (TBs) in a first transmission time interval (TTI) on a first plurality of sub-carriers;
   a transmitter configured to transmit a negative acknowledgment (NACK) that indicates that one of the plurality of TBs requires retransmission;
   the at least one receiver further configured to receive on a second plurality of sub-carriers a retransmitted one of the plurality of TBs, in a second TTI, in response to the receiving of a NACK, wherein the second plurality of sub-carriers are different than the first plurality of sub-carriers.

9. The UE of claim 8, wherein the transmitter is further configured to transmit an acknowledgment that indicates that one of the plurality of TBs does not require a retransmission.

10. The UE of claim 8, wherein the indication that one of the plurality of TBs requires retransmission is based upon a cyclic redundancy check (CRC).

11. The UE of claim 8, wherein each of the plurality of TBs has a different modulation and coding scheme (MCS).

12. The UE of claim 8, wherein each TB of the plurality of TBs has a modulation and coding scheme (MCS) that is one of M-ary quadrature amplitude modulation (QAM) or quadrature phase shift keying (QPSK).

13. The UE of claim 8, wherein the retransmitted one of the plurality of TBs has a modulation and coding scheme (MCS) that is different than the MCS of the one of the plurality of TBs.

14. The UE of claim 8, wherein each TB of the plurality of TBs are transmitted on different subcarriers.

15. A user equipment (UE) for receiving comprising:
   at least one receiver and a processor configured to receive a plurality of transport blocks (TBs) as orthogonal frequency division multiple access signals in a first transmission time interval (TTI); wherein a first TB of the plurality of TBs is received over a first set of subcarriers and a second TB of the plurality of TBs is received over a second set of subcarriers; wherein the first and second set of subcarriers are different;
   at least one transmitter and the processor further configured to generate a negative acknowledgment (NACK) in response to a determination that one of the plurality of TBs require retransmission;
   the at least one receiver and the processor further configured to receive a retransmitted one of the plurality of TBs in a second TTI; and
   the processor further configured to combine the one of the plurality of TBs that required retransmission with the retransmitted one of the plurality of TBs.

16. The user equipment of claim 15 wherein the one of the plurality of TBs is transmitted using a different modulation and coding set than the retransmitted one of the plurality of TBs.

17. A method for receiving wireless communications, the method comprising:
   receiving a plurality of transport blocks (TBs) as orthogonal frequency division multiple access signals in a first transmission time interval (TTI); wherein a first TB of the plurality of TBs is received over a first set of subcarriers and a second TB of the plurality of TBs is received over a second set of subcarriers; wherein the first and second set of subcarriers are different;
   generating a negative acknowledgment (NACK) in response to a determination that one of the plurality of TBs require retransmission;
   receiving a retransmitted one of the plurality of TBs in a second TTI; and
   combining the one of the plurality of TBs that required retransmission with the retransmitted one of the plurality of TBs.

18. The method of claim 17 wherein the one of the plurality of TBs is received using a different modulation and coding set than the retransmitted one of the plurality of TBs.

19. A Base Station comprising:
at least one transmitter configured to transmit a plurality of transport blocks (TBs) in a first transmission time interval (TTI) using a first modulation and coding scheme (MCS);
the at least one transmitter further configured to re-transmit at least one of the plurality of TBs in a second TTI using a second MCS in response to either receipt of a negative acknowledgement (NACK) or after a predefined delay period.

20. The Base Station of claim 19, wherein the first MCS is M-ary quadrature amplitude modulation (QAM) and the second MCS is quadrature phase shift keying (QPSK).

21. The Base Station of claim 19, wherein the TBs are divided by codes.

22. The Base Station of claim 19, wherein the TBs are divided by time.

23. The Base Station of claim 19, wherein the TBs are divided by time and codes.

24. The Base Station of claim 19, wherein different TBs of the plurality of TBs are transmitted by different transceivers.

25. A user equipment (UE) comprising:
at least one receiver and a processor configured to receive a plurality of transport blocks (TBs) in a first transmission time interval (TTI) using a first modulation and coding scheme (MCS);
at least one transmitter and the processor further configured to generate a negative acknowledgment (NACK) in response to a determination that one of the plurality of TBs require retransmission;
the at least one receiver and the processor further configured to receive a retransmitted one of the plurality of TBs in a second TTI using a second MCS; and
the processor further configured to combine the one of the plurality of TBs that required retransmission with the retransmitted one of the plurality of TBs.

26. The UE of claim 25, wherein the transmitter and the processor are further configured to transmit an acknowledgement (ACK) in response to a determination that one of the plurality of TBs does not require retransmission.

27. The UE of claim 25, wherein the processor is configured to combine the one of the plurality of TBs that required retransmission with the retransmitted one of the plurality of TBs using incremental redundancy.

28. The UE of claim 25, wherein the second MCS is more robust than the first MCS.

29. The UE of claim 25, wherein the first MCS is either M-ary quadrature amplitude modulation (QAM) or quadrature phase shift keying (QPSK).

* * * * *